United States Patent [19]

Jennings

[11] 4,415,286
[45] Nov. 15, 1983

[54] VARIABLE PRINT DENSITY ENCODER SYSTEM

[75] Inventor: Alan K. Jennings, Orange, Calif.

[73] Assignee: Printronix, Inc., Irvine, Calif.

[21] Appl. No.: 303,081

[22] Filed: Sep. 17, 1981

[51] Int. Cl.³ ............................................. B41J 19/32
[52] U.S. Cl. .................................... 400/279; 400/121;
400/303; 101/93.04
[58] Field of Search ............... 400/121, 124, 303, 306,
400/279; 101/93.04, 93.05

[56] References Cited

U.S. PATENT DOCUMENTS

| | | | |
|---|---|---|---|
| 4,116,567 | 9/1978 | San Pietro | 400/124 |
| 4,213,714 | 7/1980 | Jones et al. | 400/306 X |
| 4,284,362 | 8/1981 | Jackson et al. | 400/124 |
| 4,326,813 | 4/1982 | Lomicka et al. | 400/124 |

*Primary Examiner*—Paul T. Sewell
*Attorney, Agent, or Firm*—Fraser and Bogucki

[57] ABSTRACT

In a printer system in which hammers mounted along a shuttle assembly which reciprocates relative to a print paper are selectively energized to impact the paper and print dots thereon, the dot density is made variable by an encoder system responsive to the position of the shuttle assembly as it traverses a linear path of motion. The encoder system includes a decoder for generating a succession of fence post pulses as the shuttle assembly reaches each of a succession of different positions along the linear path of motion and circuitry for generating a succession of hammer firing pulses in response to and having a desired phase relationship with the fence post pulses. The hammer firing pulses may occur at a frequency the same as or different from the frequency of the fence post pulses to provide a desired print density. A stored initial offset value is used to initially establish the desired phase relationship between the hammer firing pulses and the fence post pulses. Thereafter, a stored pulse interval value is used to generate the hammer firing pulses at the desired frequency. The desired phase relationship is maintained by measuring the time distance between selected ones of the hammer firing pulses and the preceding fence post pulses, comparing the measured time interval with a stored value representing the desired offset and applying any difference as an error signal to alter the time interval between the immediately following pair of hammer firing pulses.

8 Claims, 17 Drawing Figures

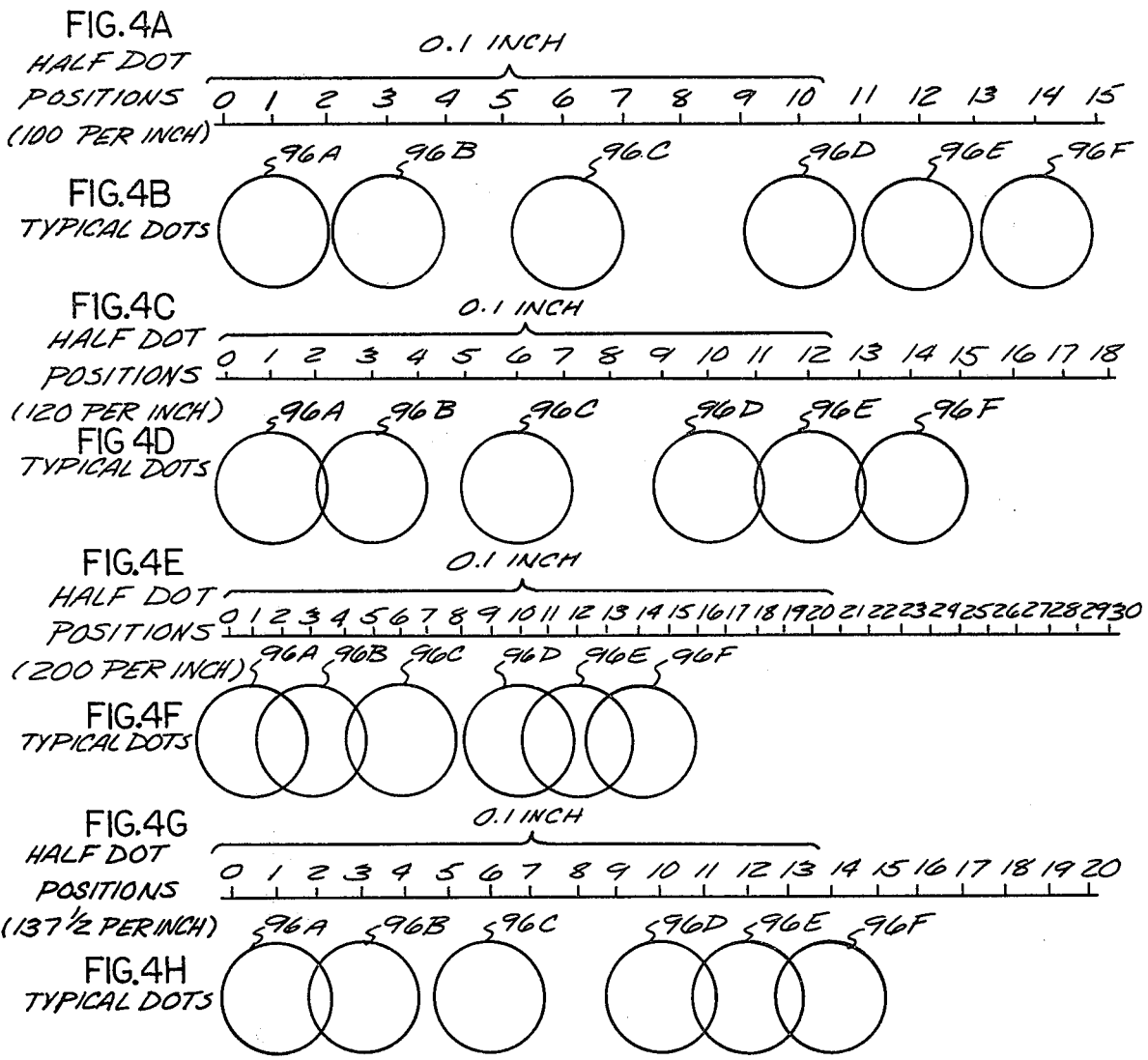
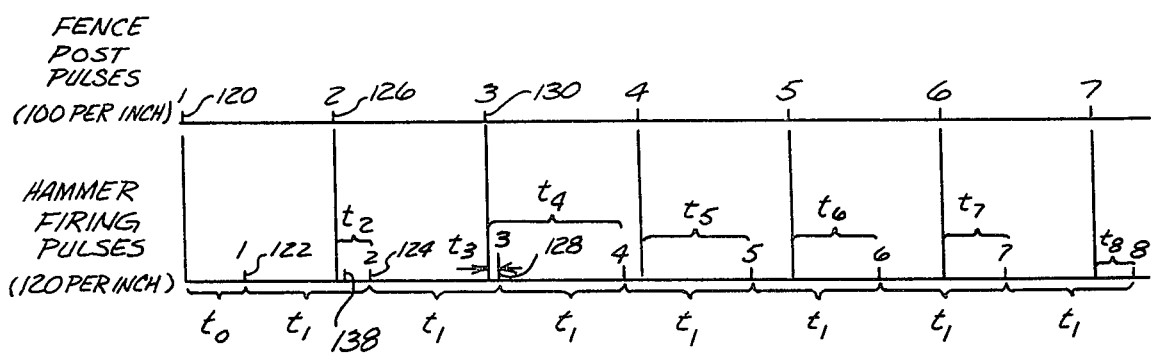
FIG.7

VARIABLE PRINT DENSITY ENCODER SYSTEM

BACKGROUND OF THE INVENTION

1. Field of the Invention

The present invention relates to printer systems, and more particularly to printer systems of the dot matrix impact type in which indications of the position of a moving shuttle assembly containing printing elements are used to provide signals for periodically energizing selected ones of the print elements to effect printing by impact.

2. History of the Prior Art

It is known to provide a printer system in which a plurality of hammers having dot printing impact tips mounted thereon and which are mounted along the length of a shuttle assembly are selectively actuated as the shuttle assembly undergoes reciprocating motion relative to a print paper or other printable medium so as to impact the paper and print dots thereon. Such a printing system is shown in U.S. Pat. No. 3,941,051 of Barrus et al., which patent is commonly assigned with the present application. In the Barrus et al. printer system the various hammers are subject to actuation at each of a succession of dot printing positions as the shuttle assembly sweeps across the print paper. At each of the dot printing positions each of the various hammers is either actuated or not actuated depending upon the value of a binary data signal associated with that hammer. The dot printing positions are determined by carefully monitoring the location of the shuttle assembly as it reciprocates back and forth across the print paper along a linear path of motion. The shuttle assembly is driven by a cantilevered shuttle drive.

A similar arrangement of a printer system is shown in a co-pending application of Barrus et al., Ser. No. 96,025, COUNTERBALANCED BIDIRECTIONAL SHUTTLE DRIVE HAVING LINEAR MOTOR, which application was filed on Nov. 20, 1979 and is commonly assigned with the present application. In the printer system of application Ser. No. 96,025 a hammer carrying shuttle assembly is reciprocated by an arrangement including a pair of opposite pulleys having an elongated frame which supports the shuttle assembly in contact with the pulleys on one side thereof and an elongated counterbalancing bar in contact with the pulleys on the opposite side thereof from the frame. The shuttle assembly mounting frame and the counterbalancing bar are held in contact with the pulleys by a band which encircles the pulleys and is coupled to the frame and bar and by the attractive forces of a magnet assembly. The magnet assembly combines with the pulleys, frame and bar to form a linear motor in which energization of coils mounted on the counterbalancing bar interacts with magnetic flux flowing through a path including the counterbalancing bar so as to drive the linear motor including the frame and the shuttle assembly in a desired fashion. The shuttle assembly is bidirectionally driven at a desired nominal speed along a linear path of motion between opposite limit positions at which the linear motor engages and rebounds from elastomeric stop members such as springs.

As the shuttle assembly in the printer system of copending application Ser. No. 96,025 undergoes movement at the desired nominal speed along the linear path of motion, a encoder is used to provide constantly updated indications of the position of the shuttle assembly along the linear path of motion. The encoder includes a strip extending along a portion of the linear motor and having a plurality of identifiable indicia or "fence posts" spaced apart along the length thereof. A detector mounted in a fixed position relative to the linear motor includes a light emitting diode for illuminating the fence posts and a phototransistor for sensing each passage of a fence post and generating a corresponding fence post pulse. The fence post pulses which define the various hammer firing positions as the shuttle assembly is swept across the print paper constitute the hammer firing pulses and are applied to hammer drivers to actuate selected ones of the hammers in accordance with the data signals associated therewith.

The resulting print or dot density is thus determined by the distance between adjacent fence posts in the encoder. The fence post spacing is chosen in accordance with the desired dot density. Once selected, the dot density remains constant unless the fence post spacing is changed. In order to always maintain the maximum possible print speed, the frequency of hammer firing pulses remains constant, determined by the intrinsic ability of the hammers to recycle. Thus, higher densities require slower shuttle speeds and lower densities allow higher shuttle speeds.

Since it is impractical or generally undesirable to change either the density of the fence posts or the nominal shuttle speed in such printer systems because of the nature of the reciprocating drive mechanism and for other reasons, the dot density remains constant and cannot easily be changed. Changing the dot density usually requires a change in the encoder so that a different fence post spacing is provided. Changing encoders may be difficult if not impossible for the average user of the printer system. In any event, it prevents the changing of print density on a rapid basis.

Accordingly, it would be desirable to provide a printer system in which the print density can be relatively quickly and easily changed to various different values and at each density to fire the hammers at the maximum rate at which they are capable of being reliably and repeatedly fired. Such an arrangement would enable a given printer system to be shared by different users desiring different print densities, and corresponding effective printing speeds, or by the same user desiring different print densities for different printed items. Changes in the print density should desirably be accomplished electronically not only for reasons of speed but to avoid the need to physically enter and make changes within the printer system.

BRIEF DESCRIPTION OF THE INVENTION

Printer systems in accordance with the invention utilize a encoder system in conjunction with a reciprocating shuttle assembly to provide electronically for changes in the print density. A encoder mounted in association with the reciprocating shuttle assembly senses the passage of identifiable indicia such as "fence posts" as the shuttle assembly reaches different locations along a linear path of motion therefor so as to generate a succession of fence post pulses. An arrangement including a plurality of different timers is utilized to generate a second succession of pulses in response to and having a desired phase relationship with the fence post pulses. The second succession of pulses is applied as hammer firing pulses to the hammer driver circuits associated with the various hammers of the shuttle assembly.

The second succession of pulses may have any of various different frequencies determining various different possible dot densities. A separate set of values is electronically stored within the encoder system for each such frequency or dot density. After utilizing a stored initial offset value to properly position the first hammer firing pulse relative to the fence post pulses and thereby initially establish a desired phase relationship between the two, a second stored value is utilized to determine the nominal time distance between the hammer firing pulses. Other stored values are compared with measurements of the time distances between the fence post pulses and the hammer firing pulses with any difference in the form of an error being applied thereafter to adjust the actual phase of the hammer firing pulses to correct for any accumulated position error caused by the shuttle speed deviating slightly from nominal.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIGS. 4A–H depict different dot positions and corresponding dot patterns illustrating variable print density in accordance with the invention;

FIG. 7 depicts the manner in which a desired phase relationship is maintained for different print densities utilizing the arrangement of FIG. 6;

DETAILED DESCRIPTION

Figure 1:
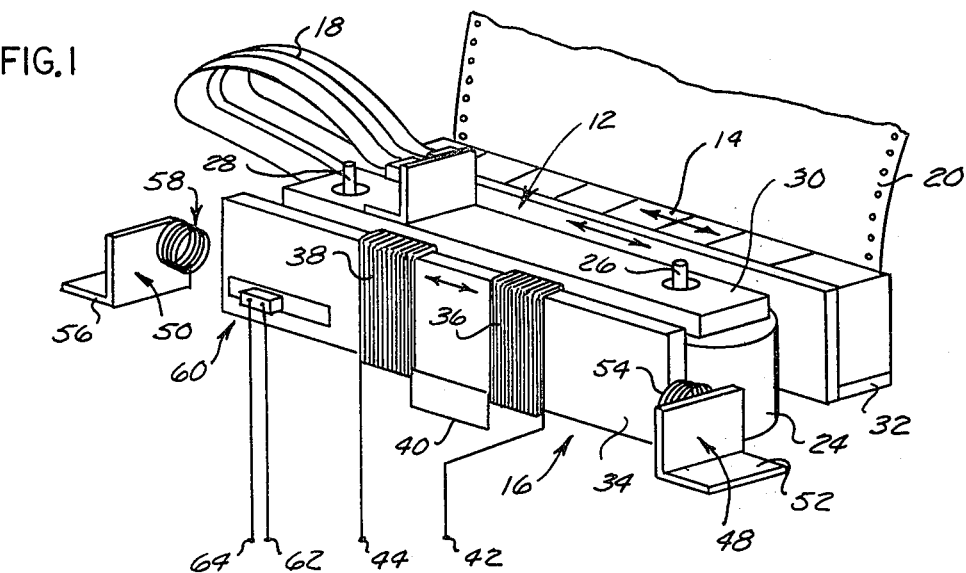
FIG. 1 is a perspective view of a portion of a printer system utilizing a encoder system in accordance with the invention.

FIG. 1 depicts a portion of a printer system comprising a shuttle drive 12. The shuttle drive 12 includes a shuttle assembly 14 and a linear motor 16. The shuttle drive 12 and included shuttle assembly 14 and linear motor 16 are shown in much greater detail in the previously referred co-pending application of Barrus et al., Ser. No. 96,025, and accordingly will only be briefly described herein.

A wire bus 18 is coupled to the shuttle assembly 14 to provide electrical connection therewith. As described in the previously referred to application of Barrus et al., the shuttle assembly 14 selectively impacts and thereby imprints on a print paper 20 via an ink ribbon 22 (shown in FIG. 3). As such, it is necessary for the shuttle assembly 14 to undergo reciprocating motion along a linear path of motion.

The shuttle drive 12 includes a pair of opposite pulleys with one of the pulleys 24 being shown in FIG. 1. The pulleys are mounted for rotation about a pair of spaced-apart, generally parallel vertical axes. The pulley 24 is mounted for rotation by a shaft 26 and the opposite pulley is mounted for rotation by a shaft 28. The shafts 26 and 28 are journaled in the opposite ends of a top frame 30 as well as in a bottom frame which is hidden from view in FIG. 1.

The shuttle assembly 14 is mounted on a generally L-shaped shuttle mounting frame 32 having opposite ends disposed in contact with the pulley 24 and the opposite pulley on one side of the pulleys. An elongated counterbalancing bar 34 is disposed in contact with the pulleys on the opposite sides of the pulleys from the mounting frame 32. The mounting frame 32 and the counterbalancing bar 34 are held in contact with the pulleys by a band (not shown) which encircles the pulleys and attaches to the frame 32 and the bar 34. The mounting frame 32 and the counterbalancing bar 34 are also held in contact with the pulleys by the attractive force of a magnetic assembly (not shown) which forms a portion of the linear motor 16 and which includes a pair of coils 36 and 38 mounted on the counterbalancing bar 34. The coils 36 and 38 are serially coupled to each other via a lead 40 and have opposite leads which terminate in a pair of terminals 42 and 44. Opposite limits of movement of the shuttle drive 12 along its linear path of motion are defined by a pair of stops 48 and 50 mounted adjacent the opposite ends of the counterbalancing bar 34. The stop 48 includes a generally L-shaped frame 52 having an elastomeric stop element in the form of a spring 54 mounted thereon and disposed in a linear path of motion for the bar 34. In like fashion the top 50 includes an L-shaped frame 56 and an elastomeric stop element in the form of a spring 58 mounted thereon and disposed within the linear path of motion of the counterbalancing bar 34. The springs 54 and 58 are alternately impacted by the opposite ends of the counterbalancing bar 34 as the bar 34 reciprocates in response to energization of the coils 36 and 38.

The previously referred to application Ser. No. 96,025 of Barrus et al. describes one particular arrangement including a servo system for driving the shuttle drive 12. Such arrangement employs a device such as an encoder 60 for generating pulses indicating a succession of different positions of the shuttle assembly 14 along the linear path of motion thereof. The encoder 60 provides the resulting succession of pulses at a pair of terminals 62 and 64. The time intervals between the pulses at the terminals 62 and 64 provide a direct representation of the actual speed of the shuttle assembly 14. Such pulses are utilized by a servo system to derive an error signal representing the difference between the actual speed of the shuttle assembly 14 and a desired nominal speed. The error signal is applied to the terminals 42 and 44 of the linear motor 16 to compensate for the error so that the shuttle assembly 14 moves at the desired nominal speed.

During turnaround of the shuttle assembly 14 by impacting of the opposite ends of the counterbalancing bar 34 into the springs 54 and 58 and rebounding therefrom, the servo system in the Barrus et al. application Ser. No. 96,025 continues to monitor the actual speed of the shuttle assembly and to generate an error signal which tends to aid in the impacting and rebounding of the opposite ends of the bar 34.

An improved servo system for driving the linear motor 16 is described in a co-pending application of David W. Mayne et al., Ser. No. 303,082, LINEAR MOTOR DIGITAL SERVO CONTROL, filed Sept. 17, 1981 and commonly assigned with the present application. The improved servo system described in that application compares the time intervals between the pulses from the encoder 60 with a reference to derive an error signal. The error signal is modified in accordance with a predetermined algorithm prior to being applied to modulate the duration of a series of pulses applied to the coils 36 and 38 as the shuttle assembly 14 undergoes movement through the linear region of operation. As the counterbalancing bar 34 approaches either of the springs 54 and 58, however, the linear motor 16 is placed under the control of a different type of servo which ignores the actual speed of the shuttle assembly 14 and generates a sequence of pulses to drive the linear motor 16 through the turnaround in accordance with known characteristics of the linear motor 16 in that direction of turnaround. A sample of the speed of the shuttle assembly 14 at the end of the immediately prior turnaround of the linear motor 16 in that particular direction is saved and is thereafter utilized to modify the sequence of pulses provided to the linear motor 16 during the immediately following turnaround in the same direction.

Figure 2:
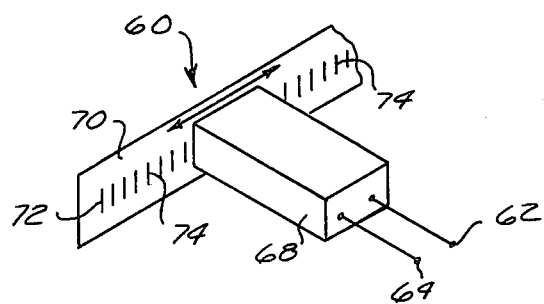
FIG. 2 is a perspective view of a encoder used in the arrangement of FIG. 1.

FIG. 2 depicts the encoder 60 of FIG. 1 in greater detail. The encoder 60 includes a sensing unit 68 mounted in a fixed location relative to the counterbalancing bar 34 and including a light emitting diode and a phototransistor. Mounted along a portion of the length of the counterbalancing bar 34 is a strip 70 having a plurality of detectable indicia 72 spaced along the length thereof. In the present example the indicia 72 comprise marks or "fence posts" 74 etched in the finish of the strip 70. As the shuttle assembly 14 undergoes movement along the path of linear motion, the counterbalancing bar 34 undergoes corresponding movement and the various fence posts 74 pass by the sensing unit 68 in such a way that they are illuminated by the light emitting diode within the sensing unit 68 and detected by the phototransistor within the sensing unit 68. Each detection of a fence post 74 by the phototransistor results in the generation of a fence post pulse at the terminals 62 and 64. The time intervals between the fence post pulses provide an accurate representation of the actual speed of the shuttle assembly 14 and are utilized to drive the linear motor 16 in the manner previously described. The fence post pulses also provide a convenient reference for firing various hammers within the shuttle assembly 14.

Figure 3:
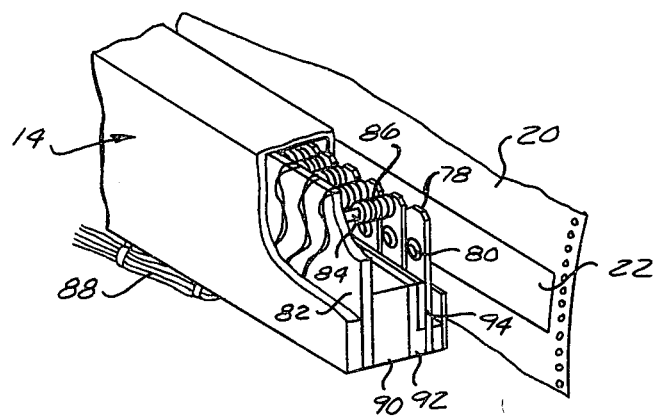
FIG. 3 is a perspective, partly broken away view of a portion of the shuttle assembly of the arrangement of FIG. 1.

The shuttle assembly 14 is shown in greater detail in FIG. 3 relative to the print paper 20 and the ink ribbon 22. The shuttle assembly 14 includes a plurality of hammers 78 mounted along the length thereof. The hammers 78 are elongated, resilient magnetic spring elements mounted at a lower fixed end in spaced-apart relation along a horizontal axis, with each of the hammers 78 being vertically disposed and terminating in a movable free end. The hammers 78 are of magnetic material, and each includes a dot matrix printing tip 80 extending normal from the surface of the hammers 78 in the direction toward the ribbon 22 and the paper 20. The tips 80 of the successive hammers 78 lie along a selected horizontal line defining the printing line position.

The planar common return member 82 is mounted in parallel, spaced-apart relation to the hammers 78 on the opposite side from the hammer tips. Individual pole pieces 84 extend outwardly from the common return member 82 into close juxtaposition to the different individual hammers 78. Each hammer 78 is in contact and in magnetic circuit with the adjacent magnetic pole piece 84 when in a retract position. Energizing coils 86 are individually wound about each of the pole pieces 84, with leads 88 from the coils 86 being coupled to the wire bus 18 shown in FIG. 1.

The magnetic circuit within the shuttle assembly 14 also includes a common permanent magnet 90 of elongated bar form, disposed between the common return member 82 and a magnetic insert 92 which abuts the fixed bottom end of each hammer 78. The magnetic insert 92 has an offset upper portion in which is disposed a resilient damping element 94 abutting the hammer surface immediately above the fixed region but not impeding the curvature of the hammers in the retract position.

The shuttle assembly 14 operates by individually releasing the hammers 78 from the retract position in which the hammers 78 are held against the pole tips of the facing pole pieces 84. A closed loop magnetic path is normally defined by the permanent magnet 90, the common return member 82, the individual pole piece 84, the hammer 78 itself and the insert 92. When retracted, each hammer 78 is held with the tip thereof out of engagement with the ink ribbon 22. When a given coil 86 is energized, however, the magnetic field in the individual circuit is neutralized adjacent the free end of the hammer 78, and the hammer 78 is released. The spring effect of the hammer 78 causes it to fly with a predetermined velocity and flight time to impact the printing tip 80 against the ink ribbon 22 and the underlying paper 20.

The shuttle assembly 14 shown in FIG. 3 is shown and described in greater detail in the previously referred to Barrus et al. U.S. Pat. No. 3,941,051.

As previously noted the encoder 60 generates fence post pulses at the terminals 62 and 64 in response to movement of the shuttle assembly 14. In the present example the distance between adjacent ones of the fence posts 74 are such that 100 fence post pulses are generated in response to each one inch of movement of the shuttle assembly 14 along the linear path of motion therefor.

FIG. 4A depicts 15 such fence post pulses. As shown therein the first 10 fence post pulses define 0.1" of movement of the shuttle assembly 14. In the present example the fence post pulses define half dot positions and are so labeled in FIG. 4A. The various hammers 78 within the shuttle assembly 14 are capable of being fired or released at any of the various half dot positions defined by the fence post pulses. Six typical dots 96A–96F are shown in FIG. 4B. The six dots 96A–96F shown are assumed to have been printed at the first, third, sixth, tenth, twelvth and fourteenth half dot positions shown in FIG. 4A. The dots 96A–96F could have been printed by the same hammer 78 or by two adjacent hammers 78. The particular printer system of the present example is arranged to operate so that within a given line, a dot is never printed at the half dot position immediately following a half dot position where a dot was printed. A minimum space equal to two half dot positions always exists between the centers of an adjacent pair of dots in a given print line. Thus, the dots 96A and 96B printed at the first and third half dot positions have the required minimum spacing of two half dot positions therebetween. There is a spacing of three half dot positions between the second and third dots 96B and 96C and a spacing of four half dot positions between the third and fourth dots 96C and 96D. The fourth, fifth and sixth dots 96D, 96E and 96F are spaced by the minimum of two half dot positions.

The distance between successive half dot positions in the present example is 0.01" or 10 mils. Accordingly, the minimum distance between the centers of an adjacent pair of dots in 20 mils, and this defines the printing or dot density. The dots 96A–96F shown in FIG. 4B are approximately 18 mils in diameter. Accordingly, an adjacent pair of dots do not quite touch each other.

In accordance with the invention the print or dot density is made variable electronically by varying the time (distance) between the half dot positions. As the distance between half dot positions increases, it is usually desirable to increase the shuttle speed correspondingly in order to print characters and line as rapidly as possible, with the ultimate limitation being imposed by the maximum rate at which the hammers may be reliably and repeatedly fired. Thus, the actual time between half dot positions usually does not vary, even though the dot density and shuttle speed may vary considerably. In the example of FIG. 4A there are 100 half dot positions per inch. FIG. 4C depicts the case where there are 120 half dot positions per inch. In this case twelve half dot positions occur with each 0.1" of travel by the shuttle assembly 14. The dots 96A–96F of FIG. 4B are shown in FIG. 4D in relation to the new half dot positions of FIG. 4C. Because the spacing between the half dot positions has been decreased while at the same time the dot diameter remains constant, adjacent dots now slightly overlap as seen in FIG. 4D.

FIG. 4E depicts the case where there are 200 half dot positions per inch. This results in there being 20 half dot positions for each 0.1" of travel of the shuttle assembly 14 as compared with 12 half dot positions in the example of FIG. 4C and 10 half dot positions in the example of FIG. 4A. As seen in FIG. 4F the dots 96A–96F and even closer together with dots separated by only two half dot positions overlapping considerably.

FIG. 4G depicts the case where there are 137½ half dot positions per inch. In this situation there are 13.75 half dot positions for every 0.1" of travel by the shuttle assembly 14. As shown in FIG. 4H the dots 96A–96F overlap more than in the case of FIG. 4D but less than in the case of FIG. 4F.

Variable dot density provides the printer system with significant advantages. Given characters can be printed in a standard size or in various compressed sizes simply by varying the density. By varying the dot matrix pattern for a given character so as to use a greater number of dots in printing that character within the given space, the character will appear in clearer and more vivid form. Where the printer system is used in a plotting mode of operation it may be necessary or desirable to place adjacent dots closer together or further apart in order to achieve certain effects.

Figure 5:
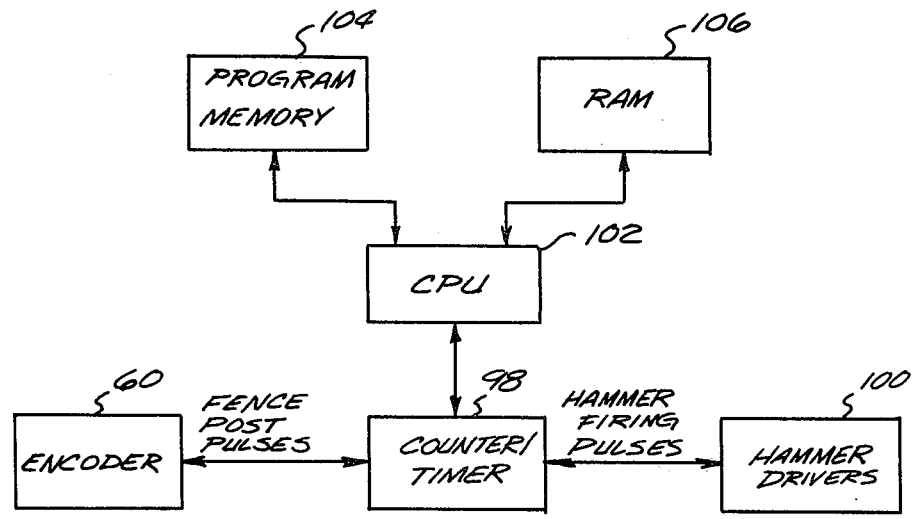
FIG. 5 is a basic block diagram of an arrangement which may be used to implement the encoder system in accordance with the invention.

One particular arrangement for providing variable print density in accordance with the invention is shown generally in FIG. 5 in conjunction with the encoder 60. Such arrangement includes a counter/timer 98 coupled between the encoder 60 and a plurality of hammer drivers 100. The counter/timer 98 is also coupled to a CPU (central processing unit) 102 which is supported by a program memory 104 and a RAM (random access memory) 106.

The encoder 60 provides the fence post pulses to the counter/timer 98. The counter/timer 98 in turn provides hammer firing pulses to the hammer drivers 100 under the control of the CPU 102. The fence post pulses remain constant at 100 per inch as shown in FIG. 4A. Where the print density of 100 half dot positions per inch is to be retained, the counter/timer 98 provides 100 hammer firing pulses per inch. In the case depicted in FIGS. 4C and 4D, the counter/timer 98 converts the 100 fence pulses per inch from the encoder 60 into 120 hammer firing pulses per inch. In the case of FIGS. 4E and 4F, the 100 fence post pulses per inch from the encoder 60 are converted by the counter/timer 98 into 200 hammer firing pulses per inch. In the case of FIGS. 4G and 4H, the 100 fence post pulses per inch from the encoder 60 are converted by the counter/timer 98 into 137½ hammer firing ulses per inch.

The hammer drivers 100 comprise a plurality of driving amplifiers, each of which is coupled to a different one of the coils 86 shown in FIG. 3. Also associated with each of the hammer drivers is a register or similar storage means for storing a binary data signal defining whether the associated hammer 78 is to be fired or not fired at each half dot position. At each half dot position, the counter/timer 98 provides a hammer firing pulse to each of the hammer drivers 100. Upon the occurrence of the hammer firing pulse, those hammers having a binary data signal in association therewith representing the printing of a dot are released so as to impact the paper 20 while those hammers having a binary data signal in association therewith representing the absence of a dot are not released.

Figure 6:
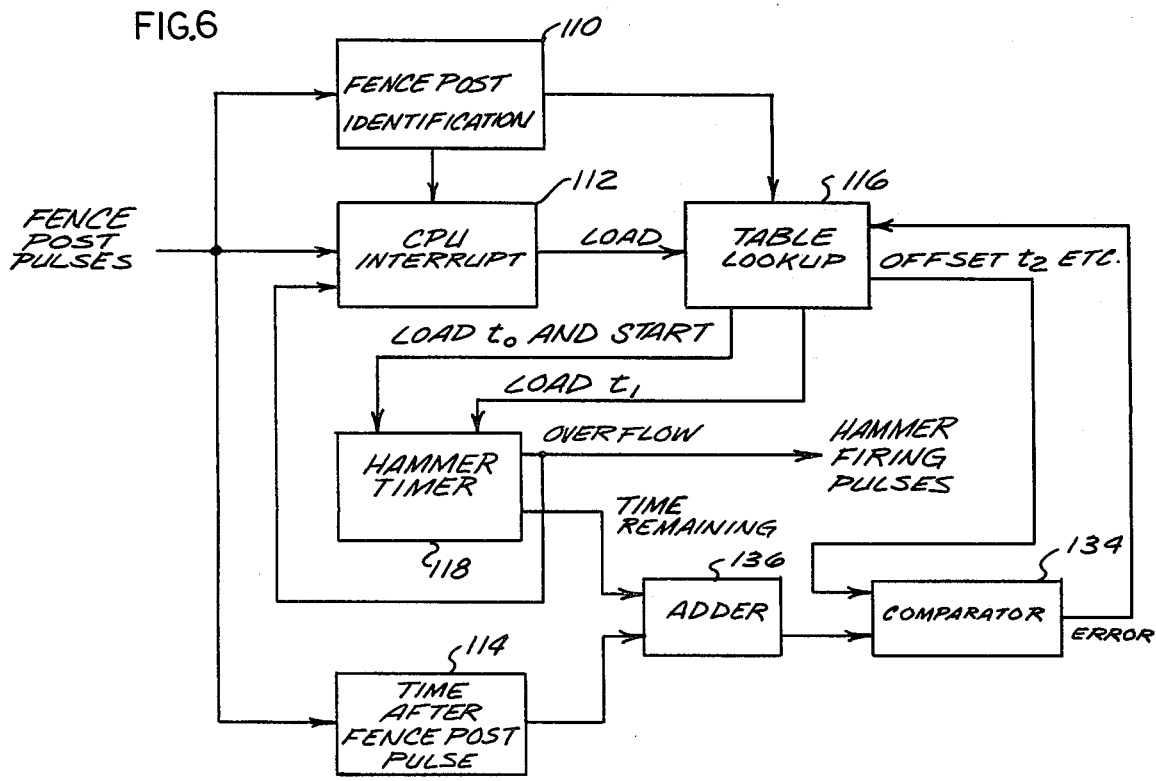
FIG. 6 is a block diagram of portions of the arrangement of FIG. 5 which function as the encoder system.

As described hereafter in connection with FIG. 6, the counter/timer 98 varies the density of the half dot positions utilizing the CPU 102 to form a table lookup with various values stored in advance in either the program memory 104 or the RAM 106. There is a different set of stored values for each density other then 100 per inch. Thus, separate sets of values are stored in the table lookup in order to provide half dot position densities of 120 per inch, 200 per inch and 137½ per inch as in the cases of FIGS. 4C, 4E and 4G respectively. Incoming user data identifies the density and thus the set of stored values which is to be used.

The counter/timer 98 identifies the various fence post pulses provided by the encoder 60. Upon the occurrence of the first fence post pulse following a turn-around of the shuttle assembly 14, a stored initial offset value is utilized to determine the offset or initial phase of the first hammer firing pulse relative to the first fence post pulse. Thereafter, a stored value representing a nominal interval or time distance between hammer firing pulses is used for purposes of generating the subsequent hammer firing pulses. The counter/timer 98 counts down from the initial offset value and subsequently from the nominal interval value to zero. Each time zero is reached a hammer firing pulse is provided to the hammer drivers 100, the counter/timer 98 again starts to count down from the nominal interval value and an interrupt is provided to the CPU 102 so as to prepare the binary data needed for controlling the firing of hammers at the next half dot position.

The values stored in the table lookup include subsequent nominal offset values representing the time distance between various different ones of the fence post pulses and the hammer firing pulses at the particular dot density being implemented. These nominal values are periodically compared with representations of the actual time positions of the hammer firing pulses and any difference therebetween representing an error is utilized to adjust the actual phase of the subsequent hammer firing pulses accordingly.

The counter/timer 98, the CPU 102, the program memory 104 and the RAM 106 which provide a variable print density encoder system in accordance with the invention are also capable of providing various other functions in the printer system. In the previously referred co-pending application of David W. Mayne et al., Ser. No. 303,082, such components function together with several other components to provide servo systems for controlling the reciprocating movement of the shuttle assembly 14 in the manner previously described. Specific examples of the counter/timer 98, the CPU 102, the program memory 104 and the RAM 106 are shown hereafter in FIGS. 8-10 arranged and interconnected in a manner to provide the variable print density in accordance with the invention along with various of the other functions performed by such components.

The counter/timer 98, the CPU 102, the program memory 104 and the RAM 106 function in accordance with the invention to provide the circuit arrangement shown in FIG. 6. In the arrangement of FIG. 6 the fence post pulses from the encoder 60 are provided to a fence post identification circuit 110, to a CPU interrupt 112 and to a time after fence post pulse circuit 114.

The fence post identification circuit 110 serves to identify the various fence post pulses coming from the encoder 60. As shown and described in connection with the co-pending application of David W. Mayne et al., Ser. No. 303,082, various channels of the counter/timer 98 can be operated in such a way as to form a gap detector. The gap detector provides synchronization when the printer system is first started by detecting the gap during the first turnaround of the shuttle assembly 14 during which no fence post pulses are generated. Thereafter, the counter begins counting with the first fence post pulse following the turnaround and continues to count through the 84th fence post pulse which signals the end of movement of the shuttle assembly 14 in that direction and the beginning of the next turnaround of the shuttle assembly 14. Thereafter, unless synchronization is lost for some reason, the counter continues to count fence post pulses following each turnaround and is thereby able to identify and distinguish each of the 84 fence post pulses during each traverse of the shuttle assembly 14. In this manner the fence post identification circuit 110 is able to instruct a table lookup 116 as to whether the system is at the first fence post or at exactly which one of the remaining 83 fence posts.

The table lookup 116 which is comprised by the CPU 102 in conjunction with the program memory 104, the RAM 106 or both, stores a separate set of values for each particular print or dot density which is to be made available. For example, if densities of 120 half dot positions per inch, 200 half dot positions per inch and 137½ half dot positions per inch are to be made available, then a separate set of values must be stored for each of these three options. The sets of values may be stored either in the program memory 104 or the RAM 106 of the arrangement shown in FIG. 5. Each set of values includes a count representing an initial offset $t_0$, a count representing a nominal hammer firing pulse separation $t_1$ and counts representing various subsequent offsets $t_2$, $t_3$, $t_4$, etc.

The table lookup 116 is coupled to a hammer timer 118 formed by one of the channels of the counter/timer 98 in the arrangement of FIG. 5. When the fence post pulse representing the first fence post is encountered and identified by the fence post identification circuit 110, the table lookup 116 loads the initial offset count $t_0$ into the hammer timer 118 and stores $t_1$ in the hammer timer 118 for later use. When the hammer timer 118 counts down by a count equal to $t_0$, and overflow signal appears at the output to provide the first one of the hammer firing pulses. The hammer timer 118 resets itself, loads $t_1$, and begins counting down by a count equal to $t_1$. As the hammer timer 118 resets itself it also initiates a CPU interrupt. Thereafter, each time the hammer timer 118 counts down by $t_1$ and overflows, a hammer firing pulse is generated and the hammer timer 118 resets itself in preparation for the next countdown of $t_1$. A CPU interrupt is initiated each time the hammer timer 118 overflows in order to prepare data for the next half dot position. A CPU interrupt is also initiated in response to the first fence post pulse as identified by the fence post identification circuit 110.

Referring to FIG. 7, the top part thereof depicts seven different fence post pulses which occur at the rate of 100 per inch. The lower portion of FIG. 7 depicts hammer firing pulses being generated at the rate of 120 per inch. Following turnaround of the shuttle assembly 14 a first fence post pulse 120 is generated as shown. The fence post identification circuit 110 identifies the pulse 120 as the first fence post pulse and responds by causing the table lookup 116 to transfer $t_0$ and then $t_1$ to the hammer timer 118 upon generation of a CPU interrupt. The CUP interrupt circuit 112 responds to the first fence post pulse by initiating a CPU interrupt which causes $t_0$ and then $t_1$ to be loaded in the hammer timer 118. When the hammer timer 118 has counted down by $t_0$, the resulting overflow at the output thereof produces a first hammer firing pulse 122 which is shown in the lower portion of FIG. 7. The initial offset $t_0$ insures that the generation of the hammer firing pulses in response to the fence post pulses is begun with the proper phase relationship. Upon generating the first hammer firing pulse 122, a CPU interrupt is again initiated as countdown of the previously loaded count value $t_1$ identifying the desired nominal time interval between hammer firing pulses is begun by the hammer timer 118. The hammer timer 118 counts down by $t_1$, at which point a second hammer firing pulse 124 is generated. Operation of the system thereafter continues in the same manner with a CPU interrupt being initiated upon the occurrence of each hammer firing pulse in order to prepare data for the next hammer firing timer and the hammer timer 118 thereafter counting down from a recycling count of $t_1$ to provide the next hammer firing pulse.

It was previously noted that each fence post pulse is provided to the time after fence post pulse circuit 114. The time after fence post pulse circuit 114 comprises a timer which is implemented by one of the channels in the counter/timer 98 of the arrangement of FIG. 5 and which begins to count down in response to the generation of each fence post pulse until it is reset and again begins counting down in response to the subsequent fence post pulse. It thus provides a measure of lapsed time from the latest fence post at any given instant. Referring again to FIG. 7 it will be seen that the second hammer firing pulse 124 occurs a time distance $t_2$ from a second fence post pulse 126. A third hammer firing pulse 128 occurs a time distance $t_3$ after the occurrence of a third fence post pulse 130. Subsequent hammer firing pulses occur at time distances of $t_4$, $t_5$, $t_6$, $t_7$, $t_8$, etc. from the third fence post pulse 130 and from subsequent fence post pulses.

The values $t_2$–$t_8$ etc. comprise subsequent offsets, and most of them are stored as count values in the table lookup 116. Each of the stored subsequent offset count values representing the desired location of one of the hammer firing pulses relative to one of the fence post pulses is compared by a comparator 134 with a count value representing the actual location of the hammer firing pulse. The actual location of the hammer firing pulse is provided to the comparator 134 by an adder 136 which adds the count value in the time after fence post pulse circuit 114 to an output of the hammer timer 118 representing the count or portion of $t_1$ remaining in the hammer timer 118 before the next hammer firing pulse will occur. Any difference between the actual and desired positions of the hammer firing pulse is determined by the comparator 134 in the form of an error signal at the output thereof which is provided to the table lookup 116. The error signal is applied by the table lookup 116 to alter $t_1$ for the next and only the next count down by the hammer timer 118 of $t_1$. Thereafter the original value of $t_1$ is used. The alteration of $t_1$ is in a direction and by an amount designed to establish the desired phase relationship between the hammer firing pulses and the fence post pulses.

Following the occurrence of each fence post pulse there is a short period of time required for the CPU 102 to respond to the CPU interrupt. Following receipt of the second fence post pulse 126, the CPU 102 responds to the corresponding interrupt at a point 138. At the point 138 the lapsed time from the fence post pulse 126 as provided by the time after fence post pulse circuit 114 is added by the adder 136 with the count remaining in the hammer timer 118 representing the time between the point 138 and the time when the hammer firing pulse 124 will be generated. The resulting sum is compared by the comparator 136 with the subsequent offset value $t_2$ which is stored in the table lookup 116 and which represents the desired time lapse between the fence post pulse 126 and the hammer firing pulse 124. Any difference in the form of an error signal is applied to the table lookup 116 to modify the value of $t_1$ that will be used following generation of the hammer firing pulse 124. The modified value of $t_1$ is used only for that interval of $t_1$. During the next interval of $t_1$ either the original value of $t_1$ is used or a modified value of $t_1$ determined by a subsequent comparison is used. Each CPU interrupt generated in response to a fence post pulse causes the table lookup 116 to provide the appropriate subsequent offset value such as $t_2$ to the comparator 134.

Following the occurrence of the third fence post pulse 130 an addition and comparison are made to determine if the next hammer firing pulse 128 will be properly located. A stored value $t_3$ is used for the comparison and the value of $t_1$ to be used following the pulse 128 is adjusted accordingly. Because only one comparison and adjustment is made within each interval between fence post pulses, the offset $t_4$ is not stored in the table lookup 116 and is not used to determine whether the fourth hammer firing pulse is properly located. The offset $t_5$ is stored and used as are the offsets $t_6$, $t_7$ and $t_8$. The various offsets to be stored such as $t_2$, $t_3$, $t_5$, $t_6$, $t_7$ and $t_8$ are computed in advance for a particular dot density and are stored in the table lookup 116. The first offset within each interval between fence post pulses must be computed and stored for the first through the 81st fence post pulses.

Figure 8:
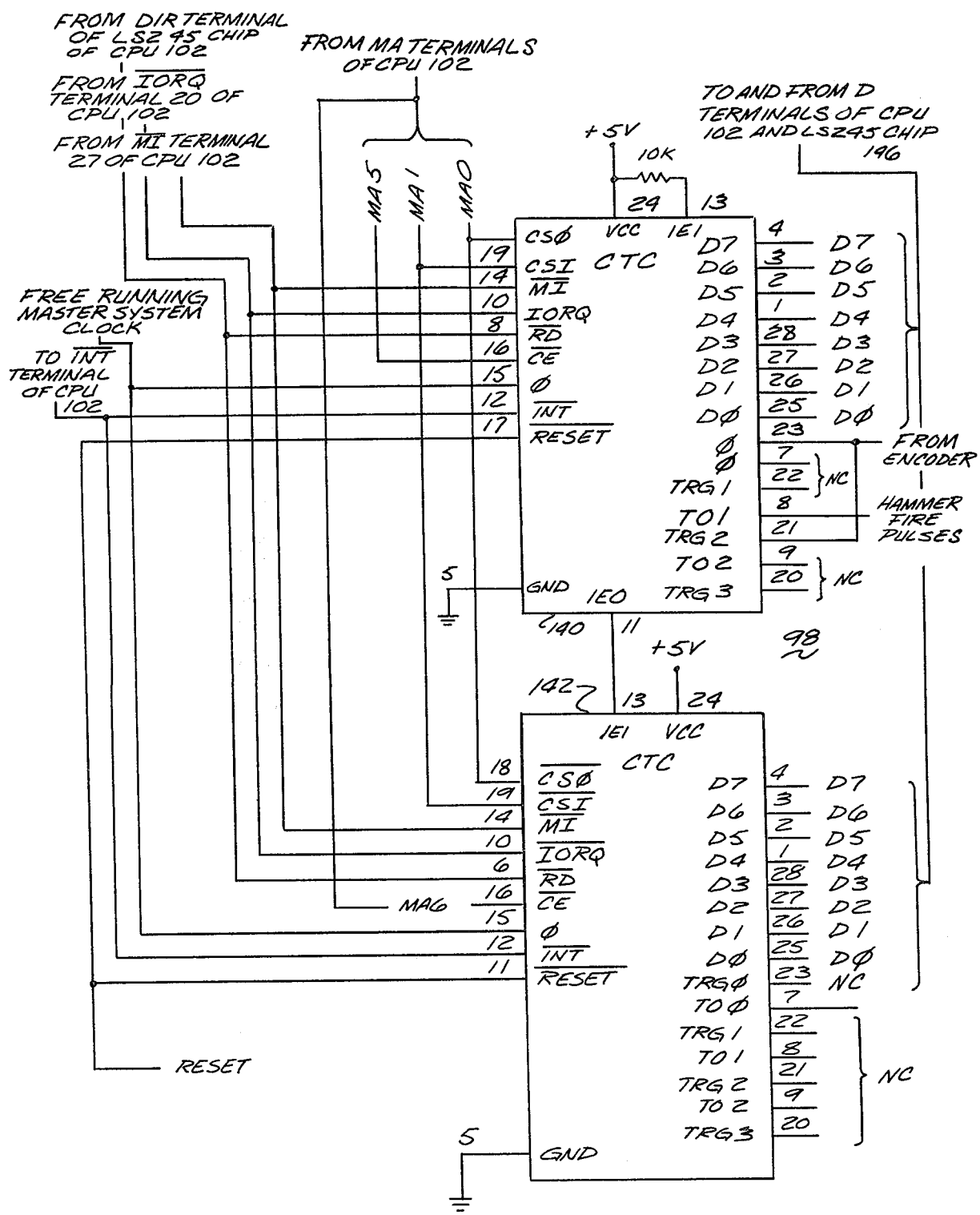
FIG. 8 is a schematic diagram of a circuit which may be used as the counter/timer in the arrangement of FIG. 5.

FIG. 8 depicts the counter/timer 98. The counter/timer 98 is comprised of two identical counter/timer chips (CTC) 140 and 142. Each of the CTC chips 140 and 142 comprises an integrated circuit chip sold under the designation Z80A CTC by Zilog Corporation. The chip 140 provides two of the channels of the counter/timer 98 with the chip 142 providing the other two channels. The fence post pulses from the encoder 60 are applied to terminals 21 and 23 of the chip 140. Except for power supplies, clock signals, reset signals and grounds, the remaining terminals of the chips 140 and 142 are coupled to the CPU 102. The TO1 terminal 8 of the chip 140 provides the hammer firing pulses. CPU interrupt is initiated by the terminals 12 of the chips 140 and 142.

Figure 9:
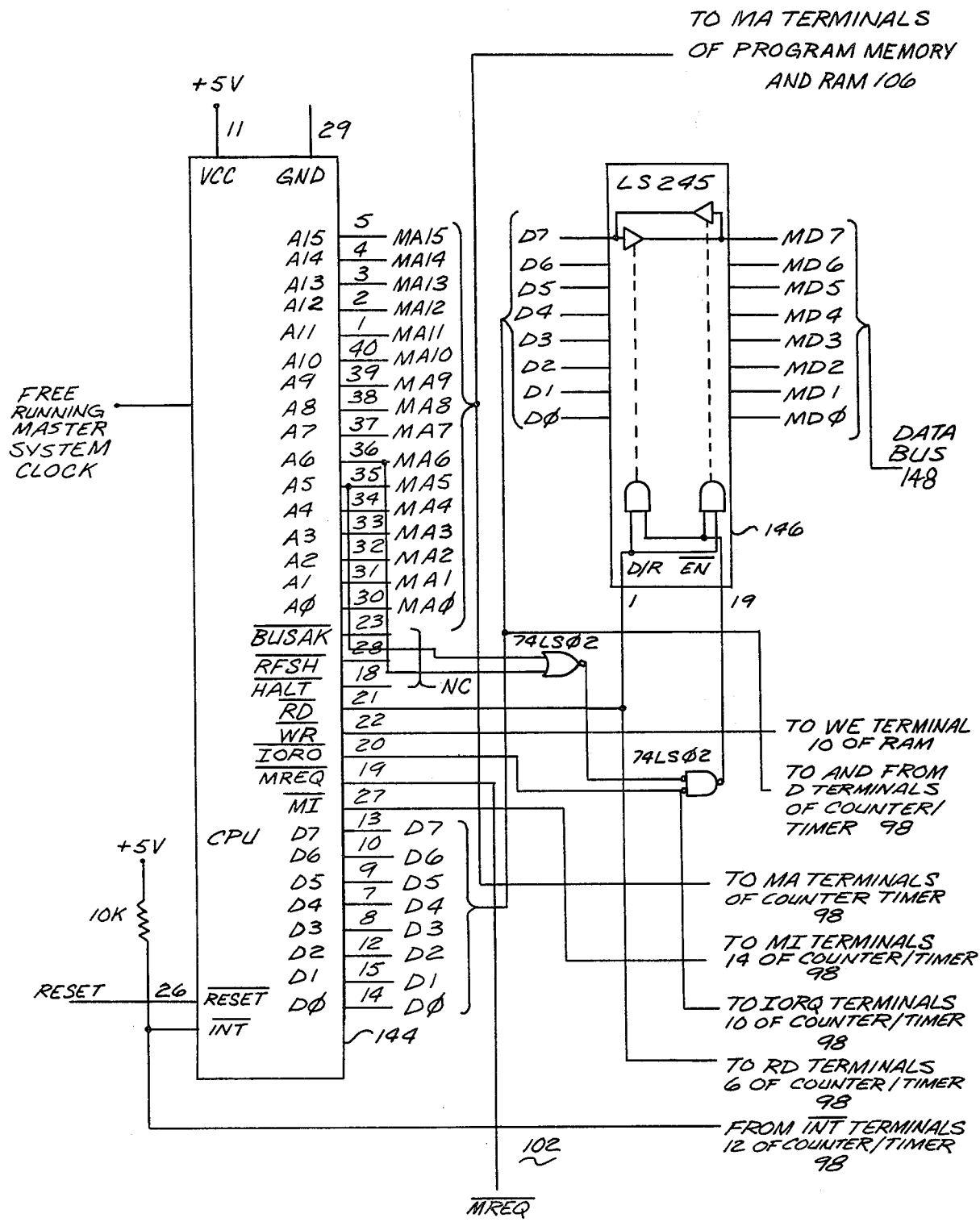
FIG. 9 is a schematic diagram of a circuit which may be used as the central processing unit (CPU) in the arrangement of FIG. 5.

FIG. 9 depicts the CPU 102. The CPU 102 is comprised of a CPU chip 144 sold under the designation Z80A CPU by Zilog Corporation. The CPU 102 also includes a chip 146 sold under the designation 74LS245 by Texas Instruments Corporation. The various D terminals of the CTC chips 140 and 142 of the counter/timer 98 are coupled to the D terminal of the chip 146 as well as to the various D terminals of the CPU 144. Various other terminals of the CTC chips 140 and 142 are coupled to various terminals of the CPU chip 144. The various MA terminals of the CPU chip 144 are coupled to the MA terminals of the program memory 104 and the RAM 106. The MD terminals of the chip 146 comprise a data bus 148 and are coupled to the various MD terminals of the program memory 104 and the RAM 106.

Figure 10:
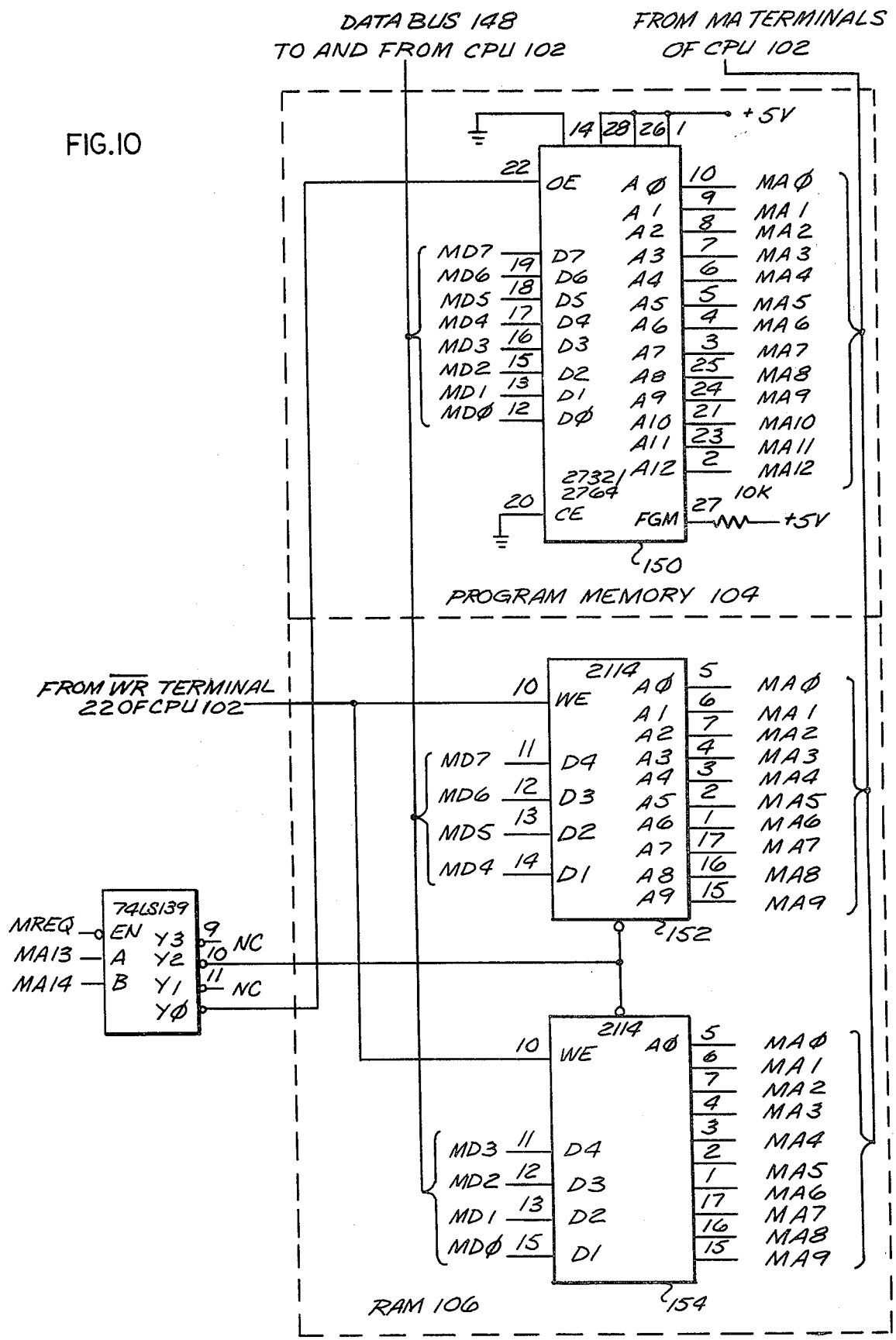
FIG. 10 is a schematic diagram of a circuit which may be used as the program memory and the RAM in the arrangement of FIG. 5.

FIG. 10 depicts the program memory 104 and the RAM 106. The program memory 104 is comprised of an integrated circuit chip 150 sold under the designation 2732 or 2764 by Intel Corporation. The RAM 106 is comprised of two different integrated circuit chips 152 and 154. The chips 152 and 154 are the type sold under the designation 2114 by Intel Corporation. As previously noted, the data bus 148 on the CPU 102 interconnects with the various MD terminals of the chips 150, 152 and 154. The various MA terminals of the CPU chip 144 are coupled to the MA terminals of the chips 150, 152 and 154. The chip 150 provides either a 4K or an 8K program memory depending upon which chip is used. The two different chips 152 and 154 together provide a 1K RAM.

While the invention has been particularly shown and described with reference to preferred embodiments thereof, it will be understood by those skilled in the art that various changes in form and details may be made therein without departing from the spirit and scope of the invention.

What is claimed is:

1. In a printer system in which a shuttle assembly having print elements mounted thereon undergoes generally linear motion along a path relative to a printable medium, an arrangement for providing variable density printing comprising means for generating a first succession of pulses as the shuttle assembly passes through a succession of different positions along the path, means for generating a second succession of pulses separated by selected time intervals, the second succession of pulses being applied to actuate selected ones of the print elements, means for storing values indicating the desired time intervals between selected ones of the first succession of pulses and selected ones of the second succession of pulses, means for measuring the actual time intervals between generation of selected ones of the first succession of pulses and generation of selected ones of the second succession of pulses, means for comparing the stored values with the measured actual time intervals to provide error signals and means for varying the occurrence of the second succession of pulses in accordance with the error signals.

2. The invention set forth in claim 1, wherein the means for generating a first succession of pulses comprises encoder having a plurality of identifiable marks mounted for movement with the shuttle assembly and a detector fixedly mounted relative to the shuttle assembly for generating a pulse in response to the passage of each of the identifiable marks relative thereto.

3. The invention set forth in claim 2, wherein the means for generating a second succession of pulses includes means for storing a value representing a desired time interval between each adjacent pair of the second succession of pulses, a counter, means for counting the counter down each time the counter is loaded with an initial count, means responsive to each counting down of the counter for loading the stored value into the counter as the initial count, and means for providing a different one of the second succession of pulses each time the counter is counted down.

4. In a printer system in which a shuttle assembly having print elements mounted thereon undergoes motion along a path relative to a printable medium, an arrangement for providing variable density printing comprising means for generating a first succession of pulses as the shuttle assembly passes through a succession of different positions along the path, means responsive to the first succession of pulses for generating a second succession of pulses having a selected phase relationship to the first succession of pulses, means for applying the second succession of pulses to operate the print elements, means for storing a time value representing an initial offset, means responsive to the occurrence of one of the first succession of pulses for generating a first one of the second succession of pulses upon lapse of the stored time value following the occurrence of one of the first succesion of pulses, means for storing a plurality of time values representing subsequent offsets, means for masuring the time lapse between each of the first succession of pulses following the occurrence of said one of the first succession of pulses and the first one of the second succession of pulses to occur thereafter, means for comparing each measured time lapse with a selected one of the stored plurality of time values to provide an error signal, and means responsive to each error signal for subsequently altering the time of occurrence of selected ones of the second succession of pulses.

5. A printer system having a shuttle assembly mounted to undergo linear motion along a path relative to a printable medium, the shuttle assembly having a plurality of dot printing impact elements mounted along the length thereof, means for generating a fence post pulse each time the shuttle assembly passes through a different one of a succession of positions as the shuttle assembly undergoes motion along the path relative to the printable medium, means for storing a plurality of different time values comprising a first value defining an initial offset of a first pulse to the plurality of dot printing impact elements and a second value defining the period between subsequent pulses to the plurality of dot printing impact elements, a timer, means responsive to the generation of fence post pulses for providing one of the stored plurality of different time values to the timer in accordance with the particular fence post pulse being generated, the timer providing a dot printing pulse to the plurality of dot printing impact elements upon termination of the time value provided to the timer, a second timer coupled to measure lapsed time from an immediately prior fence post pulse, means for adding the measured lapsed time and the time remaining in the first-mentioned timer to provide a sum, the stored plurality of different time values including a plurality of subsequent offset values, means for comparing each sum with a selected one of the stored plurality of subsequent offset values to provide an error signal in accordance with any difference therebetween, and means for applying the error signal to alter the second value within the stored plurality of different time values.

6. A printer system having a shuttle assembly mounted to undergo reciprocating movement along a linear path of motion relative to a printable medium, the shuttle assembly having a plurality of dot matrix impacting hammers mounted along the length thereof, an encoder for generating a fence post pulse in response to the passage of each of the plurality of identifiable indicia extending along a portion of the shuttle assembly relative to a fixed location adjacent the shuttle assembly, a hammer timer for providing hammer firing pulses to the dot matrix impacting hammers, a table lookup for storing an initial offset count, a pulse interval count and a plurality of subsequent offset counts, an identification circuit for loading the initial offset count and the pulse interval count in the hammer timer in response to the identity of a fence post pulse generated by the encoder, an interrupt circuit coupled to initiate a countdown of the hammer timer from a count loaded therein in response to the generation of a first fence post pulse by the encoder and each time the hammer timer counts down by a count loaded therein, a time after fence post pulse timer for measuring the lapsed time following the generation of each fence post pulse by the encoder, an adder for adding the lapsed time from the time after fence post pulse timer to any count remaining in the hammer timer to provide a sum, a comparator for comparing the sum with a selected one of the plurality of subsequent offset counts in the table lookup to provide an error signal representing a difference therebetween, and means for applying the error signal to adjust the value of the pulse interval count in the table lookup.

7. The invention set forth in claim 6, wherein each of the dot matrix impacting hammers includes an energizing coil therefor, and further including a plurality of hammer drivers, each being capable of storing a data signal, being coupled to energize the coil of an associated hammer, and being operative to energize the coil in accordance with the data signal in response to the receipt of a hammer firing pulse from the hammer timer.

8. The invention set forth in claim 6, wherein the table lookup stores an initial offset count, a pulse interval count and a plurality of subsequent offset counts for each of a plurality of different possible print densities for the printer system.

* * * * *

UNITED STATES PATENT AND TRADEMARK OFFICE
CERTIFICATE OF CORRECTION

PATENT NO. : 4,415,286
DATED : November 15, 1983
INVENTOR(S) : Alan K. Jennings

It is certified that error appears in the above-identified patent and that said Letters Patent are hereby corrected as shown below:

Column 4, line 37, after "the" (second occurrence) and before "50", "top" should read --stop--. Column 8, line 21, after "firing" and before "per", "ulses" should read --pulses--. Column 10, line 36, after "The" (first occurrence) and before "interrupt", "CUP" should read --CPU--. Column 13, lines 13 and 14, after "comprises" and before "encoder" insert --an--; line 48, after "for" and before "the" (first occurrence), "masuring" should read --measuring--.

Signed and Sealed this

Thirteenth Day of March 1984

[SEAL]

Attest:

Attesting Officer

GERALD J. MOSSINGHOFF

Commissioner of Patents and Trademarks